Oct. 12, 1937.   T. B. PRICKETT ET AL   2,095,266
CONVERTER AND ITS ASSEMBLY
Filed March 4, 1935   3 Sheets-Sheet 2

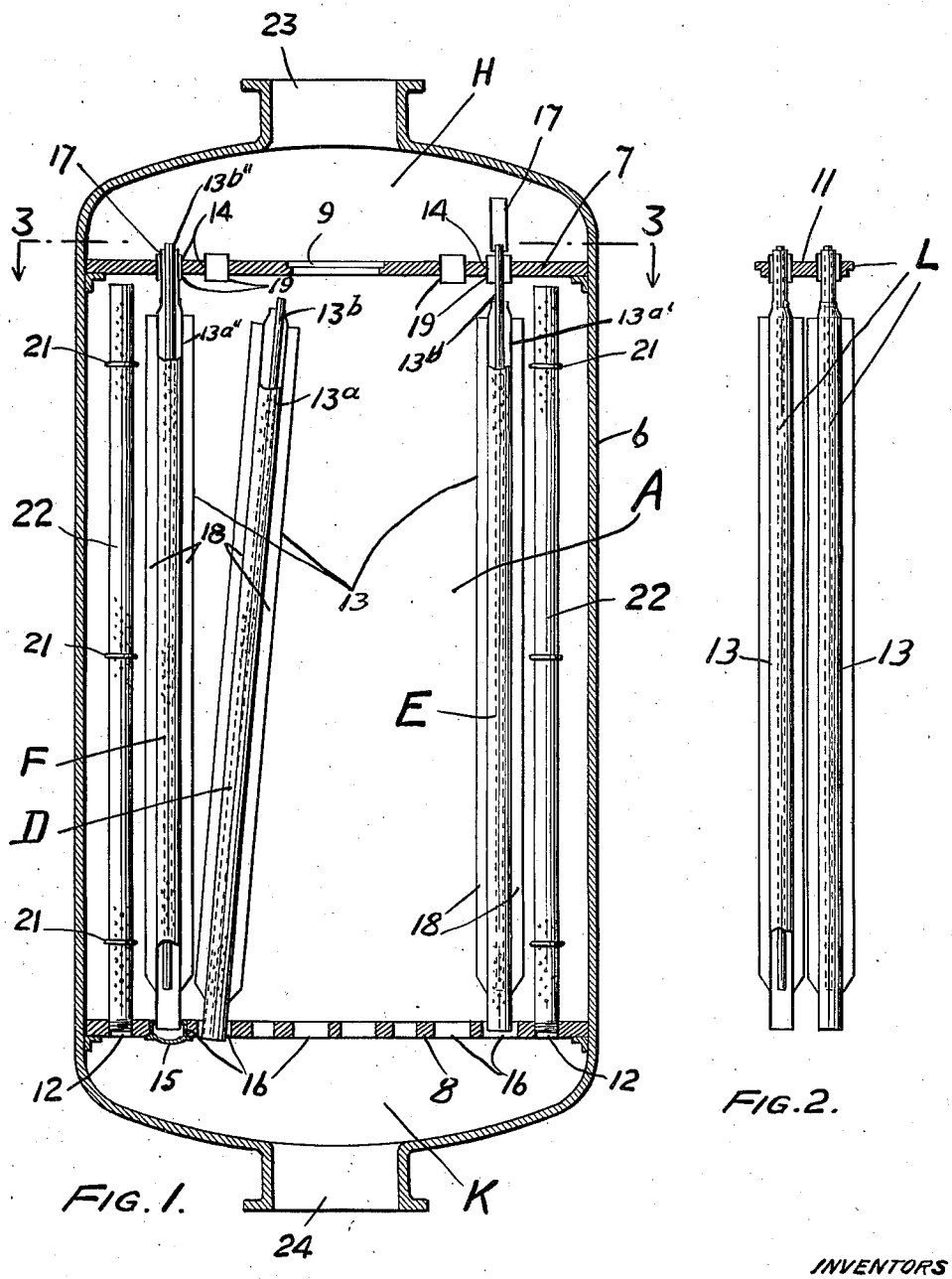

INVENTORS
Thomas B. Prickett
Raymond C. Lassiat
BY Ira L. Nickerson
ATTORNEY.

WITNESS:

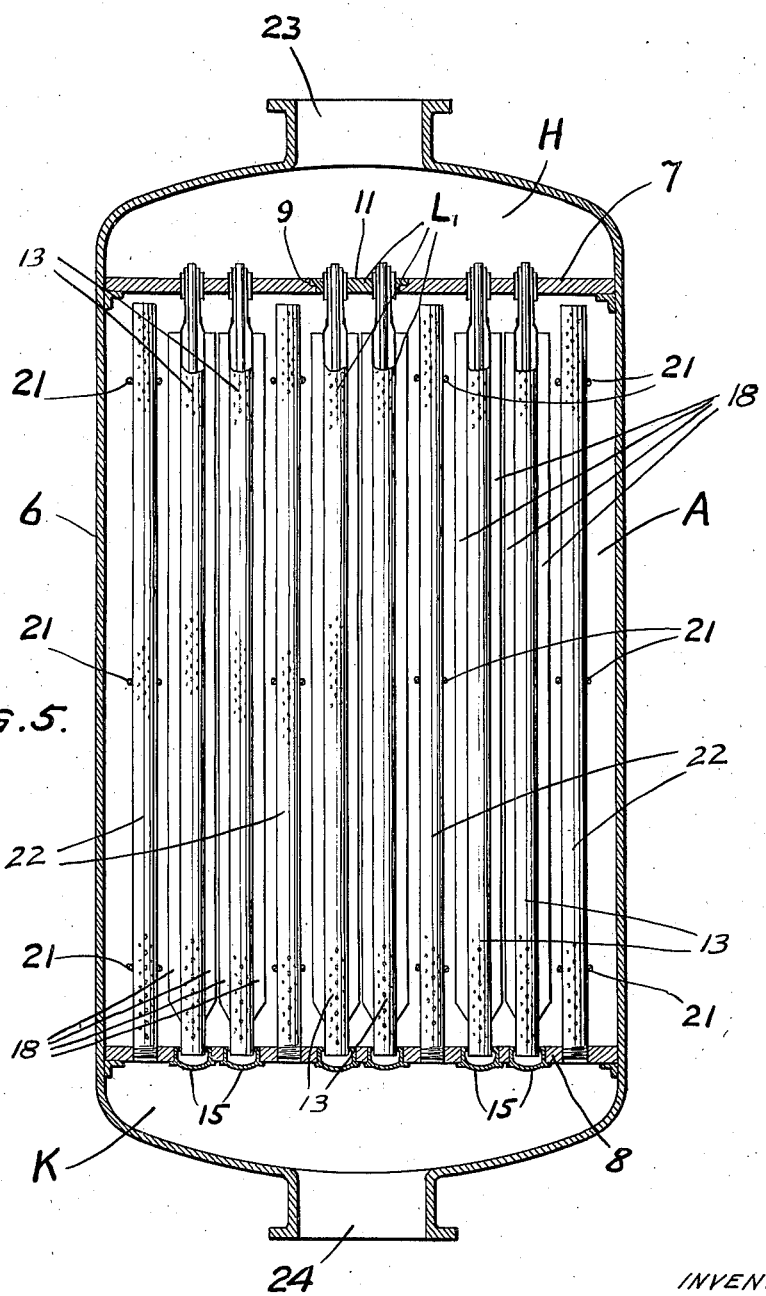

Patented Oct. 12, 1937

2,095,266

UNITED STATES PATENT OFFICE 2,095,266

CONVERTER AND ITS ASSEMBLY

Thomas B. Prickett and Raymond C. Lassiat, Woodbury, N. J., assignors to Houdry Process Corporation, Dover, Del., a corporation of Delaware Application March 4, 1935, Serial No. 9,180

9 Claims. (Cl. 23—288)

This invention relates to apparatus for effecting chemical reactions. It is particularly concerned with converters employing a contact mass whether inert, reactive or possessing catalytic activity. It is more particularly directed toward converters having fluid distributing members and/or fluid collecting or outlet members embedded in the mass, including those described and claimed in U. S. Patent 1,987,904, issued to Eugene J. Houdry on January 15, 1935, and in the copending application of Eugene J. Houdry, Serial No. 611,362, filed May 14, 1932 which issued on June 2, 1936 as Patent No. 2,042,468. The invention presents practical and simple solutions of the structural features and mechanics of assembly in apparatus of the type described.

One object of the invention is to facilitate assembly of a vessel of the type described. Another object is to provide efficient and simple mountings for fluid distributing and/or fluid collecting members. Still another object is to combine the operations of assembling and mounting fluid distributing and/or fluid collecting members in the converter. Still other objects will be apparent from the detailed description which follows.

The invention involves inserting fluid distributing and/or fluid collecting elements into a reaction chamber through a suitable opening provided in a wall of said chamber and mounting said members in one or more of the chamber walls. In a preferred form of the invention, members of one or more series of fluid conduits to extend across said chamber are inserted into the reaction chamber and mounted in the wall containing the opening or manhole and/or in a wall opposite thereto. After insertion, the individual elements are first positioned and then mounted in place, the assembly progressing from the periphery of the chamber toward the manhole. When a series of conduits is mounted in the wall providing the manhole, to complete the assembly, the remaining one or more conduits of that series are attached to a cover for said manhole thereby forming a bundle which is inserted as a unit into the reaction chamber and the manhole cover is fastened to the wall in a fluid tight manner. The invention contemplates also the mounting and simultaneous assembly of finned conduits and/or conduits comprising members in nested relation. The invention includes also mounting means for the conduits.

In order to illustrate the invention, one concrete embodiment thereof is shown in the accompanying drawings, in which:

Fig. 1 is a vertical section through a converter which is in the process of assembly;

Fig. 2 is a vertical section through a bundle of conduits mounted on a cover plate prior to insertion into the converter shown in Fig. 1;

Fig. 5 is a vertical section through the completely assembled converter shown in Figs. 1 and 3.

Figure 3:
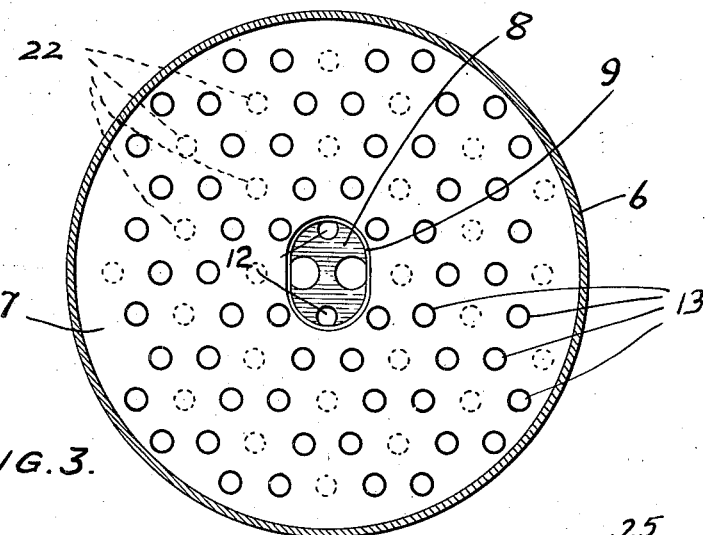
Fig. 3 is a transverse sectional view taken substantially along line 3—3 of Fig. 1 showing a partially assembled converter.

In the converter shown in Figs. 1, 3 and 5, shell or casing 6 provides tube sheets or partitions 7 and 8 extending thereacross in spaced relation and cooperating to define or provide opposed walls of reaction chamber A for containing a contact mass (not shown). A series of conducting elements in substantial parallelism to deliver fluids to or remove fluids from the mass in chamber A is mounted in each of partitions 7 and 8, as for example a series of distributing conduits 13 mounted in partitions 7 and a series of collecting conduits 22 mounted in partition 8. A suitable opening is provided in one of the walls of reaction chamber A to permit insertion of the elements of both series thereinto prior to mounting them in partitions 7 and/or 8. In the form shown, such aperture or manhole is provided at 9 in partition 7. The mounting of the elements is effected progressively from the converter shell toward the aperture 9, and any elements remaining are mounted on a suitable cover plate 11 for manhole 9 to form a compact bundle or unit capable of insertion into the reaction chamber. Fig. 2 shows such a bundle indicated at L and comprising conduits 13 mounted on manhole cover 11. It is to be understood that there will be no such bundle and the cover 11 will be imperforate when only one conduit series is provided to be mounted in lower partition 8. When the assembly involves insertion and mounting of two series of fluid elements in a reaction chamber in predetermined interposed relation to form a definite pattern across the chamber, as for example the pattern indicated in Fig. 3 wherein conduits 13 are mounted in partition 7 and conduits 22 are mounted in partition 8 to be interspaced between conduits 13 the pattern is completed progressively from the reaction chamber wall toward the periphery of the manhole, and the assembly completed by the bundle shown in place at L' in Fig. 5.

The conduit elements suitable for use in the converter include single conduits and conduits comprising members in nested or telescoped relation, elements of either type having extensions or fins mounted thereon if desired. In some instances it is desirable to utilize conduits shorter than the reaction chamber and having a free end, preferably adjacent a chamber wall. In other cases, the conduits are longer than the reaction chamber and extend thereacross to have a free end within or outside of a chamber wall positioned and guided by the wall or by means associated therewith.

In Fig. 1, a portion of the conduits are shown in place while others are in progressive stages of the mounting operation. Short elements are exemplified by conduits 22 received by threaded perforations 12 in partition 8 and are, after insertion into chamber A, readily positioned and mounted in place. Elements D, E and F are conduits of series 13 in various stages of mounting and assembly and illustrate conduits of the longer type. Element D, comprising outer member 13a and inner member 13b in loosely nested relation therewithin, is shown immediately after insertion into chamber A with its lower end thrust into one of the perforations 16 in partition 8 and being swung into position for effecting completion of assembly and mounting. Element E, shown ready for these steps, has its outer member 13a' in readiness to receive extension member 17 being thrust through one of the perforations 14 in partition 7 and has its inner member 13b' raised to bring the upper end thereof above partition 7. Extension 17, after being applied to outer member 13a', is secured to partition 7 either directly or in suitable supporting or mounting means associated therewith, as for example, sleeves or nipples 19 in perforations 14. Element F shows extension 17 in place, secured on the one hand to outer member 13a" and on the other to partition 7, and in addition inner member 13b" has been secured to extension 17. Extensions 17 are of particular value in mounting fluid conducting elements having projections or fins such as 18 thereon since this arrangement permits the fins to terminate in close proximity to the reaction chamber wall. It is to be understood, however, that in some instances long single or nested conduits are mounted without the use of extensions such as 17 and that in those cases the nested conduits can be secured together in assembled relation before insertion into the reaction chamber.

Figure 4:
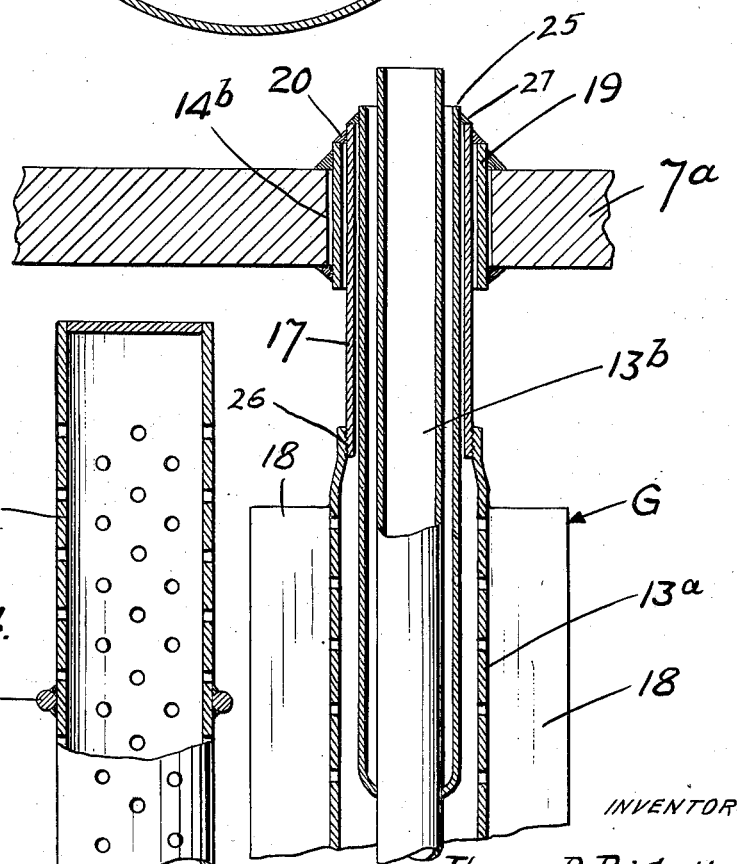
Fig. 4 is a vertical section on an enlarged scale through a portion of the converter shown in Figs. 1 and 5.

The mounting of one of these nested elements is disclosed on a larger scale and in somewhat more detail in Fig. 4, but since the element differs slightly in structure from those previously described it is referred to by reference character G but like parts have the same reference characters as those used in Fig. 1. In this figure, element G has, in addition to outer member 13a and inner member 13b, a sleeve 25 attached at its lower end to and forming an annular space around inner member 13b which may or may not be filled in known manner with heat insulating material. Sleeve 19 mounted in perforation 14b of wall 7a supports extension 17, as by a welded joint 20, and from extension 17 depend outer member 13a (as by threaded joint 26) and sleeve 25 carrying inner member 13b, as by welded joint 27. In the interest of strength of wall 7a and of limitation of heat exchange between the latter and element G, extension 17 is preferably of smaller diameter than outer member 13a.

Figs. 1, 4 and 5 also disclose means associated with a conduit for guiding and positioning that member and neighboring conduits. Such means may take the form of rings 21 attached to conduits 22 to permit restricted lateral movement of said conduits with respect to each other and free axial movement of either or both. Injury to conduits 22 by fins 18 is prevented since, in this instance, fins 18 will engage rings 21. As shown in Figs. 1 and 5, a plurality of rings 21 are preferably applied to the conduits at suitable intervals.

The converter provides manifolding chambers or reservoirs H and K (Figs. 1 and 5) at the ends of the reaction chamber A to serve as distribution or collection centers for reactants about to enter or reaction products which have been discharged from chamber A. A suitable opening, such as 23, is provided in the end of casing 6 into chamber H, said opening being preferably in alignment with aperture 9 in partition 7 and of sufficient size to permit insertion and removal of individual fluid elements or a bundle of them mounted on a cover plate such as 11. A second opening, such as 24 in shell 6, provides access to the outer face of partition 8 to assist in the assembly of the converter, as, for, example, in the positioning of fluid elements having free ends extending into partition 8 and in applying closures such as 15.

The converter is intended for use in any process involving distribution of fluid through and/or removal of fluid from within a contact mass, whether the mass be merely a spreading agent, or absorbing body, or whether it promotes or even enters into the reaction. Such processes include the synthesis of ammonia, alcohols, sulphuric acid and organic or inorganic syntheses effected with the aid of a catalyst, the purification of gases and other fluids, the transformation of hydrocarbons, etc., and the contact masses may be regenerated in situ by feeding reactivating material thereto. The aperture providing access to the reaction chamber may appear in the lower wall of the reaction chamber as well as in the upper wall. Although the converter is disclosed in a vertical position, it may equally as well be assembled and operated in a horizontal position.

We claim as our invention:

1. In the assembly of a converter providing a reaction chamber and manifold chambers, the steps of mounting walls therein to separate the manifold chambers from the reaction chamber, one wall being adapted to receive the ends of and to support a series of finned conduits longer than said reaction chamber to extend thereacross and to have free ends and the second wall being opposed to said first wall and adapted to receive and guide the free ends of said conduits, one of said walls providing a manhole with a cover, inserting said conduits into said reaction chamber through said manhole, inserting said free ends of said conduits in said second wall, mounting said conduits in said first wall while progressing with said mounting from the periphery of said chamber toward said manhole, and mounting said manhole cover in place.

2. In the assembly of a converter providing a casing having a restricted opening in one end thereof, a perforated partition extending across said casing for supporting conduits of substantially larger diameter than the perforations therein and defining one end of an enclosed reaction chamber, said partition being provided with an opening substantially larger than said conduits in alignment with the opening in said casing and a cover plate for said opening, the steps of inserting a portion of said conduits through said aligned openings and into said chamber, mounting said conduits in the perforations in said partition by means of extensions having a diameter suitable for accommodation by said perforations, effecting said mounting progressively from the periphery of said casing to said large opening, mounting the remainder of said conduits on said cover plate to form a bundle, inserting said bundle through said aligned openings and into said reaction chamber, and securing said cover in place over said opening in said partition.

3. In the assembly of a converter having a casing with restricted openings in opposed ends thereof and providing a reaction chamber therein defined by partitions extending thereacross, one of said partitions being provided with perforations for mounting the ends of a series of finned conduits to extend across and have free ends adjacent the other end of said chamber, one of said partitions providing an opening and a cover plate therefor, said opening being substantially larger than said conduits and in alignment with the opening in the corresponding end of said casing, said last named opening being at least as large as said opening in said partition, the steps of inserting a portion of said conduits through said aligned openings and into said reaction chamber, mounting one end of said conduits in said perforated partition progressively from the periphery of said casing toward the opening in said partition, mounting the remainder of said conduits on said cover plate to form a bundle, and inserting said bundle through said aligned openings and into said reaction chamber to mount said cover plate in place over the opening in said partition.

4. In the assembly of a converter providing a reaction chamber and manifold chambers, the steps of mounting walls therein to separate the manifold chambers from the reaction chamber, one wall being adapted to receive and support a series of conduits to extend across the reaction chamber and to have free ends, the other wall being opposed to the first wall and adapted to receive and support a second series of finned conduits to extend across the reaction chamber in interspersed relation with the first series of conduits to form a pattern across the reaction chamber and to have free ends, one of said walls providing a manhole with a cover plate, inserting members of both said conduit series into said reaction chamber through said last named wall, mounting said conduits in the appropriate walls to progressively complete said pattern from the periphery of said chamber toward said manhole, mounting members of the appropriate series in said manhole cover to form a bundle, inserting said bundle into said reaction chamber, and mounting said manhole cover in place.

5. In the assembly of a converter providing a reaction chamber having two series of fluid conduits extending thereinto and having free ends, one series being shorter than said reaction chamber, the other series having fins extending therefrom and being longer than said reaction chamber, and having a wall adapted to receive the free ends of said longer conduits and the opposed wall of said chamber providing a manhole with a cover, the steps of inserting said shorter conduits through said manhole and into said chamber, mounting said conduits in a wall of said chamber, inserting a portion of said finned conduits through said manhole and into said chamber, thrusting the free ends of said portion of said finned conduits into said first named wall, mounting said portion of said finned conduits in said second named wall, forming a bundle of the remainder of said finned conduits by fastening the same to said manhole cover, inserting said bundle into said reaction chamber, and fixing said manhole cover in place.

6. In a converter for effecting chemical reactions, a shell, a partition at one end of said shell extending thereacross to define one end of a reaction chamber, said partition having a manhole to permit insertion of fluid conduits into said reaction chamber, a cover plate for said manhole, said shell having an opening in alignment with said manhole of sufficient size to permit passage of said cover plate therethrough, and a series of apertured conduits mounted in said partition to extend substantially across said reaction chamber and to establish communication between the latter and the space on the other side of said partition, certain members of said series being mounted in said cover plate to form with the latter a unit insertable and removable through said opening.

7. In a converter for effecting chemical reactions, a shell, a pair of partitions in spaced relation across said shell cooperating to define a reaction chamber therebetween, one of said partitions providing a manhole to permit insertion of fluid conduits into said reaction chamber, a cover plate for said manhole, an opening in said shell in alignment with said manhole of sufficient size to permit passage of said cover therethrough, a series of fluid distributing conduits mounted in one of said partitions to extend across said chamber and to have free ends adjacent said other partition, a series of fluid collecting conduits mounted in said other partition to also extend across said chamber and to have free ends therewithin, and members of the appropriate series mounted in said cover plate to form a removable unit.

8. A converter for effecting chemical reactions comprising a casing having restricted openings at opposed ends thereof, a pair of partitions extending across said casing and defining a reaction chamber therebetween, said partitions providing perforations for accommodating the ends of conduits, one of said partitions providing an opening substantially in alignment with the opening in the adjacent end of said casing to permit insertion of conduits through said aligned openings and into said reaction chamber, a cover plate for said opening in said partition, a series of conduits having fins projecting therefrom mounted in the perforations of one of said partitions to extend across and have free ends adjacent the other end of said chamber, a second series of conduits mounted in the perforations of the other of said partitions to extend across and have free ends adjacent the first partition, and members of the appropriate series of conduits mounted in said cover plate to form a unit capable of removal from and insertion into said converter through said opening in said adjacent end of the casing.

9. A converter for effecting chemical reactions comprising a casing having restricted openings at opposed ends thereof, a pair of perforated partitions extending across said casing and defining a chamber for containing a contact mass, a series of conduits mounted in a portion of the perforations of one of said partitions to extend across said chamber and to have free ends therewithin, a portion of a second series of conduits having fins projecting therefrom mounted in the perforations of the second partition to extend across said chamber and having free ends within perforations in said first partition, an opening in said second partition substantially in alignment with the opening in the adjacent end of said casing for the insertion of said conduits through said aligned openings and into said chamber, a cover plate for said opening, members of said second series of conduits mounted in said cover plate and extending across said chamber to have free ends in perforations in said first partition thereby to provide a unit capable of removal from and insertion into said converter.

THOMAS B. PRICKETT.
RAYMOND C. LASSIAT.